Figure 1:
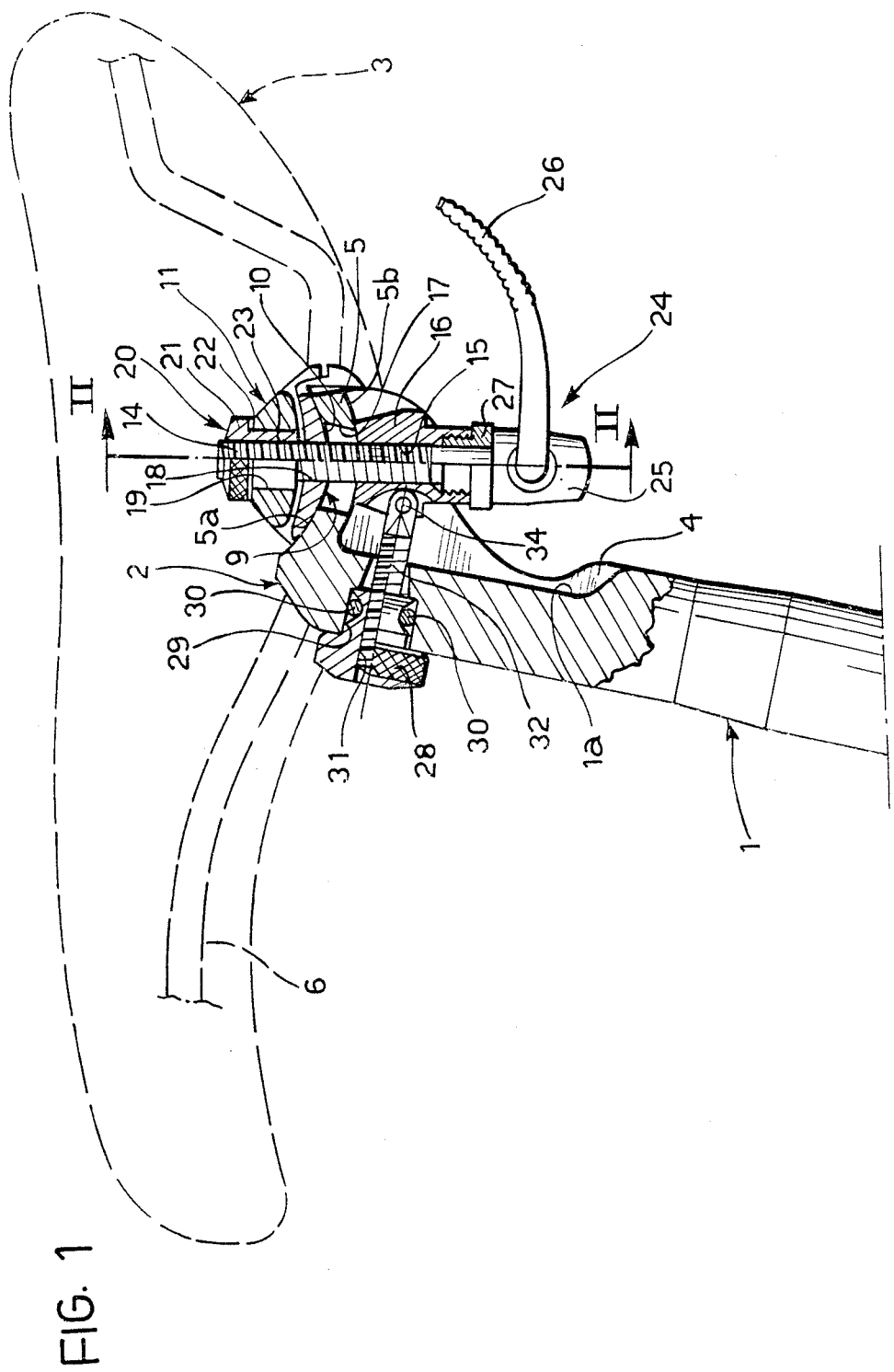

United States Patent [19]
Romano

[11] Patent Number: 4,836,604
[45] Date of Patent: Jun. 6, 1989

[54] SADDLE PILLAR FOR BICYCLES AND THE LIKE, PROVIDED WITH MEANS FOR ADJUSTING THE ATTITUDE OF THE SADDLE

[75] Inventor: Antonio Romano, Padova, Italy
[73] Assignee: Campagnolo S.p.A., Vicenza, Italy
[21] Appl. No.: 207,485
[22] Filed: Jun. 16, 1988
[30] Foreign Application Priority Data
Jun. 16, 1987 [IT] Italy ................ 67518 A/87
[51] Int. Cl.$^4$ .............................. B62J 1/00
[52] U.S. Cl. ................... 297/195; 297/203; 403/87
[58] Field of Search ........... 297/195, 203; 403/87, 403/86
[56] References Cited
U.S. PATENT DOCUMENTS
4,155,590 5/1979 Cunningham ............ 297/195
4,180,345 12/1979 Routens ............... 297/195 X
FOREIGN PATENT DOCUMENTS
2514601 10/1975 Fed. Rep. of Germany ...... 297/195
2529853 1/1984 France .................. 297/195

Primary Examiner—James T. McCall
Attorney, Agent, or Firm—Sughrue, Mion, Zinn, Macpeak & Seas

[57] ABSTRACT

A saddle pillar for bicycles and the like comprises a support element fixable to the bicycle frame and having a head on which a device for supporting and clamping the saddle is mounted in an adjustable position. The latter comprises a lower support and an upper bracket between which a part of the load-bearing structure of the saddle is interposed, and clamping means which urge the lower support and the upper bracket against each other and against the head of the support element to clamp the part of the load-bearing structure of the saddle. The head of the support element is provided with adjustment means for effecting a variation of the position of the device for clamping the saddle to the head of the support element after the release of the clamping means. The clamping means preferably comprise a lever device for rapid clamping and release, while the adjustment means comprise a micrometric adjustment device.

8 Claims, 3 Drawing Sheets

U.S. Patent  Jun. 6, 1989  Sheet 1 of 3  4,836,604

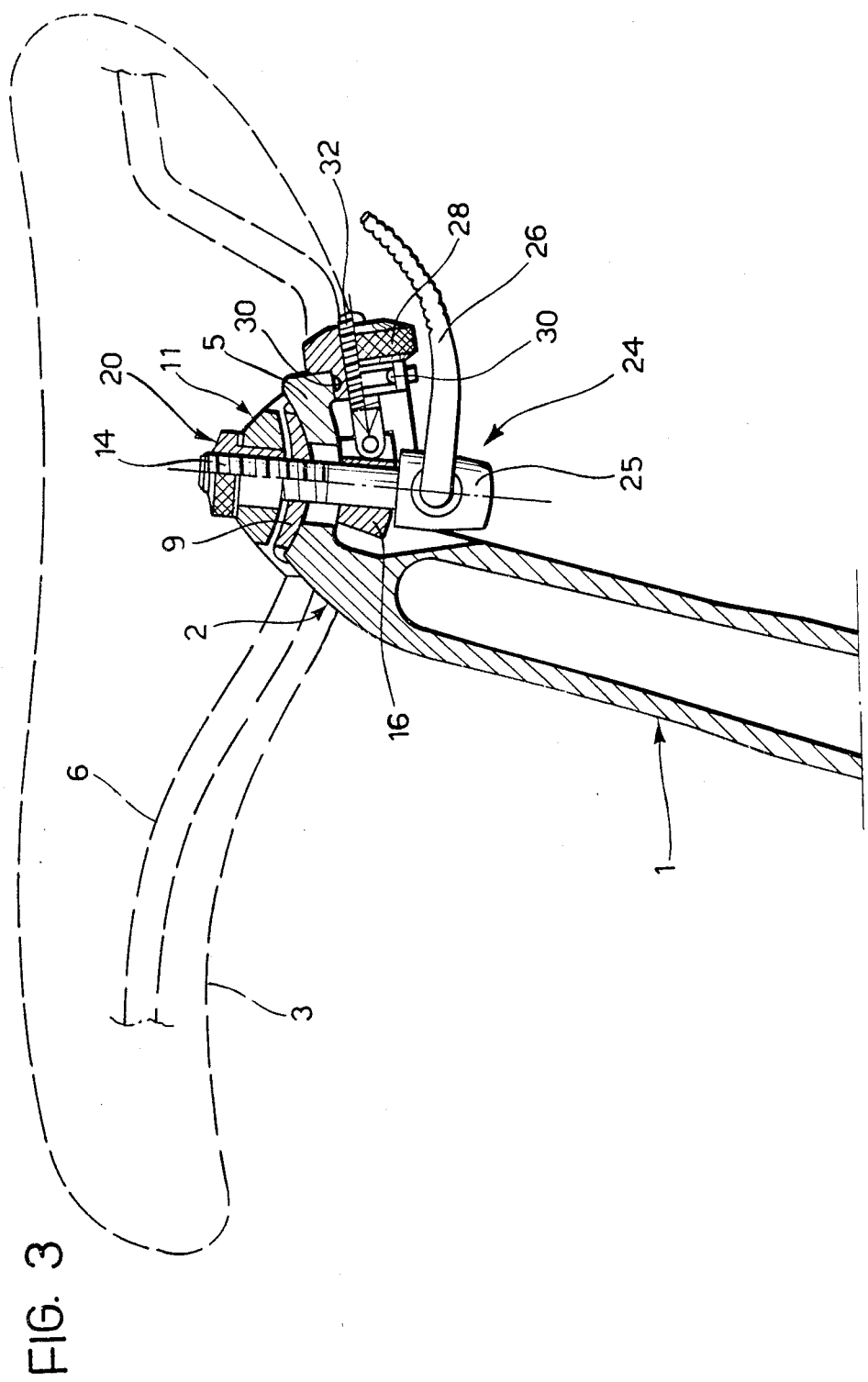

SADDLE PILLAR FOR BICYCLES AND THE LIKE, PROVIDED WITH MEANS FOR ADJUSTING THE ATTITUDE OF THE SADDLEcl DESCRIPTION

The present invention relates to saddle pillars for bicycles and the like, of the type comprising:

a support element which can be fixed to the bicycle frame and has a head on which the saddle is mounted, a device for supporting and clamping the saddle, mounted in an adjustable position on the head of the support element and comprising a lower support and an upper bracket between which a part of the load-bearing structure of the saddle is interposed, and clamping means which urge the lower support element to clamp the part of the load-bearing structure of the saddle.

In devices of the above-specified type, the clamping means are constituted by a bolt which can be operated by a spanner, so that the operation necessary to alter the attitude of the saddle must be carried out with the bicycle stationary. This is obviously a disadvantage in the case of racing bicycles and means that the cyclist requires the help of a mechanic when he wishes to change the attitude of the saddle during the race. The adjustment of the attitude of the saddle is effected by releasing the clamping bolt and the spanner and acting on the saddle so as to bring it into the new position desired, after which the clamping means can be clamped again. It is thus especially laborious to bring the saddle exactly to a particular desired position.

In order to avoid this problem, the subject of the invention is a saddle pillar for bicycles of the type indicated at the beginning of the present description, characterised in that the support element for the saddle is provided with adjustment means for effecting a variation of the position of the device for clamping the saddle to the head of the support element after the release of the clamping means. In a preferred embodiment, the clamping means comprise a lever device for rapid clamping and release, and the adjustment means comprise an adjustment member connected to the device for clamping the saddle and mounted for movement in the support element, and male-and-female thread means for effecting the movement of the adjustment member. For example, the adjustment member may consist of a threaded tie rod which is connected to the device for clamping the saddle and is engaged in a threaded hole of an adjustment knob carried by the support element in an axially fixed position.

By virtue of the characteristics indicated above, the saddle pillar according to the invention enables easy and precise adjustment of the attitude of the saddle. Furthermore, if the clamping means are constituted by a rapid clamping and release lever device, the saddle pillar according to the invention enables the adjustment operation to be carried out by the cyclist even whilst the bicycle is moving, which is particularly advantageous in the case of a racing bicycle.

Figure 2:
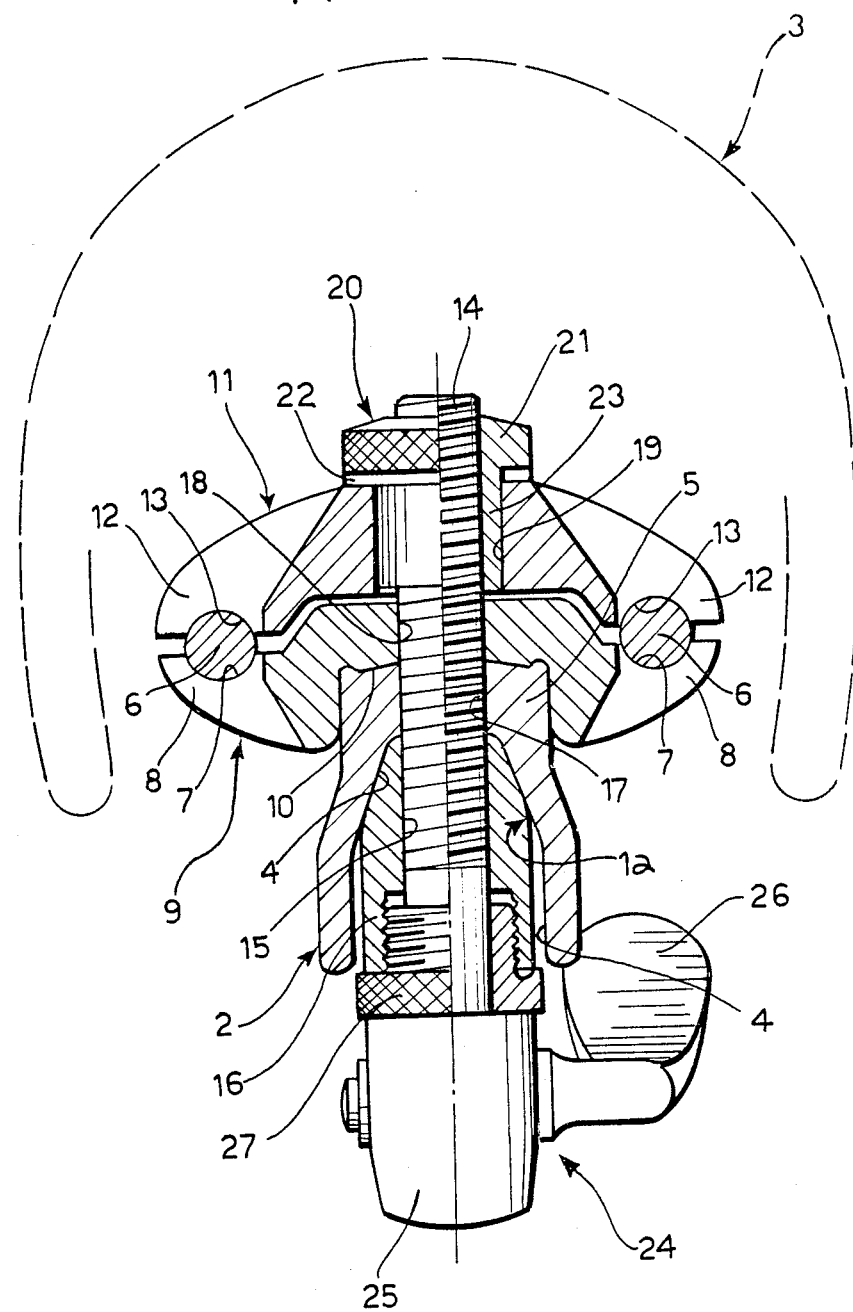

Further characteristics and advantages of the present invention will become clear from the detailed description which follows with reference to the appended drawings, provided purely by way of non-limiting example, in which:

FIG. 1 is a sectioned side elevational view of a saddle pillar for bicycles, according to the invention, FIG. 2 is a section taken on the line II—II of FIG. 1, and FIG. 3 shows a variant of FIG. 1.

In FIG. 1, a tubular element, indicated 1, for supporting the saddle can be fixed, in known manner, in a seat of the bicycle frame (not illustrated) and had a head 2 on which the saddle 3 (illustrated by a broken line in the drawings) of the bicycle is mounted. On its rearward side (with reference to the direction of travel of the bicycle) and adjacent the head 2, the support element 1 has a recess 1a defined by two lateral walls 4 and by a curved upper wall 5 whose concavity faces upwardly and whose opposite surfaces are indicated 5a and 5b. In accordance with known techniques, two circular-sectioned wires 6 (see also FIG. 2), which constitute the springs as well as the load-bearing structure of the saddle 3, have their central parts bearing on seats 7 formed in two pairs of longitudinal spaced lateral wings 8 of a support 9 (the two rear lateral wings 8 are visible in FIG. 2). The support 9 has a convex central lower surface 10 the shape of which corresponds to that of the upper surface 5a of the wall 5 of the head 2 of the support element 1 and which bears on the surface 5a. The two metal wires 6 are clamped in the seats 7 by means of an upper bracket 11 which bears on the lower support 9 and which has two pairs of longitudinally spaced lateral wings 12 (FIG. 2 shows the two rear lateral wings of the upper backet 11) having seats 13 for clamping the two metal wires 6 from above.

The upper bracket 11 and the lower support 9 are urged against each other and against the wall 5 of the head of the support element 1 by means of a threaded rod 14, so as to keep the saddle 3 clamped in a fixed position. The rod 14 is engaged with clearance in a through-hole 15 of a tubular body 16 situated in the cavity 4 and having an upper surface which is in contact with the lower surface 5b of the wall 5 of the head 2 and has a shape complementary to that of the surface. The threaded rod 14 is also engaged with clearance in a longitudinal slot 17 formed in the wall 5, as well as in respective holes 18, 19 formed in the central parts of the lower support 9 and the upper bracket 11. One end of the threaded rod 14 is engaged in a nut 20 having a head 21 which bears on the upper surface of the bracket 11 with the interposition of a washer 22, and a tubular body 23 engaged within the hole 19 of the bracket 11. In the example illustrated, the clamping of the group of element through which the threaded rod 14 passes can be achieved rapidly by means of a rapid clamping and release lever device 24 of known type with an eccentric, commonly used for the connection of the hubs of racing-bicycle wheels to the bicycle frame. This device is illustrated only schematically in the appended drawings, since it is of known type and since the elimination of these structural details from the drawings renders the latter more readily and easily understood. Essentially, the device 24 comprises a cap 25 which reacts against the lower end surface of the tubular body 16 and within which is slidably mounted the end of the threaded rod 14 opposite that which is engaged in the nut 20. According to known techniques, this end has a transverse slot (not visible in the drawings) engaged by an eccentric pin (also not illustrated) which is fixed to an operating lever 26 rotatably mounted on the cap 25. When the lever 26 is in the position illustrated, the end of the threaded rod 14 provided with the nut 20 is in the position nearest to the cap 25, so that the group of elements through which the rod 14 passes is clamped. When the lever 26 is brought into a position in which it is rotated from that illustrated in FIG. 1, which, as is known, is achieved after passing a dead-point, the end of the rod 14 carrying the nut 20 is brought into the position farthest from the cap 25 so that the group of elements is loosened and it is thus possible to adjust the position of the support 9, and hence of the saddle 3, relative to the wall 5 of the head of the support element 1. Moreover, in the embodiment illustrated, an adjustment nut 27, through which the rod 14 passes, is interposed between the cap 25 and the lower end of the tubular body 16 and is screwed into a threaded, enlarged-diameter lower portion of the hole 15 in the tubular body 16.

In the saddle pillar according to the invention, once the clamping of the lower support 9 of the bracket 11 has been loosened, the adjustment of the attitude of the saddle can easily be achieved by operating an adjustment knob 28 which is mounted rotatably in a through-hole 29 formed in the support element 1 adjacent the head 2 and which is clamped axially in position within this hole by any known means (in the example illustrated, by means of two transverse pins 30 which engage a circumferential groove formed in the outer surface of the adjustment knob 28). The knob 28 has a threaded axial through-hole 31 which is engaged by an end of a threaded tie rod 32 whose opposite end is articulated at 34 to the tubular body 16.

When the lever device 24 is in its loosened condition, therefore, it is possible easily to adjust the attitude of the saddle 3 by operating the knob 28 and thus causing a variation of the axial position of the threaded tie rod 32 relative to the knob 28. The variation of the position of the tie rod 32 causes a consequent variation in the position of the tubular body 16, and of all the other elements connected by the threaded rod 14, relative to the wall 5 of the head of the tubular element. Micrometral adjustment of the attitude of the saddle is thus achieved. Once the new desired position is reached, the saddle can be clamped again by operating the lever 26 so as to bring it back to the position illustrated in FIG. 1.

Naturally, the details of construction may vary widely with respect to those described and illustrated in the appended drawings. For example, the rapid clamping device 24 could be replaced by a normal bolt operable by means of a spanner. Similarly, the configuration of the wall 5 of the head 2 could differ from that illustrated. For example, the wall could be formed with its concavity facing downwardly. The adjustment means could also be made with a different structure from that illustrated purely by way of example in the appended drawings. In the case of the example illustrated, all the elements are made of metal, but this could also be varied.

FIG. 3 illustrates a particular variant of FIG. 1, in which all the parts in common with FIG. 1 have been indicated by the same reference numerals. In the solution illustrated in FIG. 3, the adjustment nut 27 has not been used and the adjustment knob 28 is situated on the rear of the head 2 (with reference to the direction of the travel of the bicycle) instead of on the front, as in the case of FIG. 1.

Naturally, the principle of the invention remaining the same, the forms of embodiment may be varied widely with respect to those described and illustrated purely by way of non-limiting example, without thereby departing from the scope of the present invention.

I claim:

1. A saddle pillar for bicycles and the like, comprising:
    a support element which can be fixed to the bicycle frame and has a head on which the saddle can be mounted,
    an auxiliary bracket adjustably mounted on the head of the support element, with a part of the load-bearing structure of a saddle adapted to be interposed between the head of said support element and said auxiliary bracket,
    clamping means operably connected to said auxiliary bracket for urging said auxiliary bracket toward the head of the support element to clamp said part of the load-bearing structure of the saddle,
    adjustment means for effecting a variation of the position of said auxiliary bracket and said clamping means relative to the head of said support element so as to vary accordingly the position of the saddle, said adjustment means comprising an adjustment member operatively connected to said clamping means, said adjustment member being operable after the release of said clamping means to vary the position of the saddle relative to the head of the support element.

2. A saddle pillar according to claim 1, wherein the clamping means includes a rapid clamping and release lever device.

3. A saddle pillar according to claim 1, wherein said head of the support element has an upper support surface having an upwardly facing concavity, said auxiliary bracket being urged toward said upper surface by said clamping means.

4. A saddle pillar according to claim 3, wherein between said upper support surface of the support element and said auxiliary bracket is interposed a lower support having a lower surface matching said upper support surface, said part of the load-bearing structure of the saddle being clamped between the auxiliary bracket and the lower support.

5. A saddle pillar according to claim 4, wherein said clamping means comprises:
    a threaded rod passing through said head of the support element, as well as through said lower support and said auxiliary bracket,
    a nut engaged on said threaded rod and bearing on said auxiliary bracket,
    a tubular body through which the threaded rod extends, having a front end with an upwardly facing concavity urged against a lower surface of the head of the support element, said lower surface having a shape complementary to that of the front end of the tubular body.

6. A saddle pillar according to claim 5, wherein said adjustment means comprise an adjustment knob having a threaded hole therein, rotatably mounted on the support element in an axially fixed position, said adjustment member being constituted by a threaded tie rod engaged in the threaded hole of the adjustment knob and having one end connected to said tubular body.

7. A saddle pillar according to claim 6, wherein the adjustment knob is situated on the front of the head of the support element.

8. A saddle pillar according to claim 6, wherein the adjustment knob is situated on the rear of the head of the support element.

* * * * *